SEAT BACK LOWERING MECHANISM

Original Filed Sept. 26, 1952 3 Sheets-Sheet 1

INVENTOR.
HENRY C. BORISCH
BY Carl J. Barbee
ATTORNEY

SEAT BACK LOWERING MECHANISM

Original Filed Sept. 26, 1952 3 Sheets-Sheet 2

INVENTOR.
HENRY C. BORISCH
BY Carl J. Barbee
ATTORNEY

SEAT BACK LOWERING MECHANISM

Original Filed Sept. 26, 1952 3 Sheets-Sheet 3

INVENTOR.
HENRY C. BORISCH
BY Carl J. Barbee
ATTORNEY

United States Patent Office

Re. 24,528
Reissued Sept. 2, 1958

24,528

SEAT BACK LOWERING MECHANISM

Henry C. Borisch, Crandon, Wis., assignor to American Motors Corporation, a corporation of Maryland Original No. 2,712,345, dated July 5, 1955, Serial No. 311,709, September 26, 1952. Application for reissue July 3, 1957, Serial No. 670,847

14 Claims. (Cl. 155—7)

Matter enclosed in heavy brackets [ ] appears in the original patent but forms no part of this reissue specification; matter printed in italics indicates the additions made by reissue.

This invention relates to improvements in automobile seats and the principal object of the invention is to provide [a front seat construction for automobiles whereby said seat may be readily adjusted to a plurality of intermediate reclining positions] *a seat assembly in which the back rest portion thereof may be adjusted to a plurality of intermediate reclining positions relative to the cushion portion thereof.*

I am aware that the convertible seat arrangement for automobiles is not broadly new. [Under the circumstances it will be manifest that it is my chief aim to generally improve upon prior structures of the general type by providing an arrangement characterized by appreciable refinements and structural improvements especially adapted to serve their proportionate share in the development of an ingenious and dependable accommodation for the occupants of the automobile when desiring certain reclining conveniences.]

One of the features of the present invention is its adaptability to automobiles in which the seat backs are divided and [constructed with hinged back] *hinged relative to the seat frame* so that they may be individually controlled to tilt forwardly for access to the rear of the automobile, or to be released from their normal *upright* [supporting] position to adjusted reclining positions.

*A specific object of the invention is to provide in a reclining type seat structure, seat back rests which are hinged to the seat frame and which employ latching mechanisms for allowing the back rests to be lowered under the influence of gravity in successive steps, such back rests being capable of being restored to upright position.*

*A further object is to provide in a latching mechanism for a reclining type seat means for arresting the downward movement of the back rests during each successive step in the lowering of same, such means also incorporating an appropriate indexing feature functioning in conjunction with the arresting means.*

*A more specific object of the invention is to provide in a reclining type seat structure a latching mechanism including spaced brackets provided with notches formed similarly in each bracket and an indexing and movement arresting bracket having a notched segment arranged adjacent to one of said notched brackets. Secured to an operating shaft is a latch rod which is movable between the notches of one of the brackets and the notches in the indexing and movement arresting bracket whereby to effect automatic lowering of the seat back rests one notch at a time.*

[The present invention is also characterized by a set of brackets having spaced notches which are intermittently engaged by a pawl associated with and forming an integral part thereof of a longitudinally extending shaft in turn actuated by a lever suitably disposed for ready manipulation by an occupant of either of said divided seats. The cooperation of said brackets and said pawl positively assure the desired position of the respective seats and lock said seats against displacement.]

[A further object of the invention is to provide spaced brackets provided with notches formed similarly in each bracket and a floating plate having a notched segment arranged adjacent one of said brackets together with an operating shaft and latch rods whereby automatic lowering of the seat back is affected one notch at a time by manual manipulation of a hand lever arranged on one end of said shaft and one end of one of said rods so that the end of the other rod intermittently engages the notches in the bracket and the notches in the floating plate.]

A still further object of the invention is to provide a front seat construction and arrangement which is of relatively simple construction, inexpensive to manufacture and install, and thoroughly efficient and reliable in operation and otherwise well adapted for the purpose for which it is designed.

The invention possesses other objects and features of advantage, some of which with the foregoing, will be set forth in the following description of the preferred form of the invention which is illustrated in the drawings accompanying and forming part of the specification. It is to be understood, however, that variations in the showing made by the said drawings and description may be adapted within the scope of the invention as set forth in the claims.

Referring to the drawings.

Figure 1:
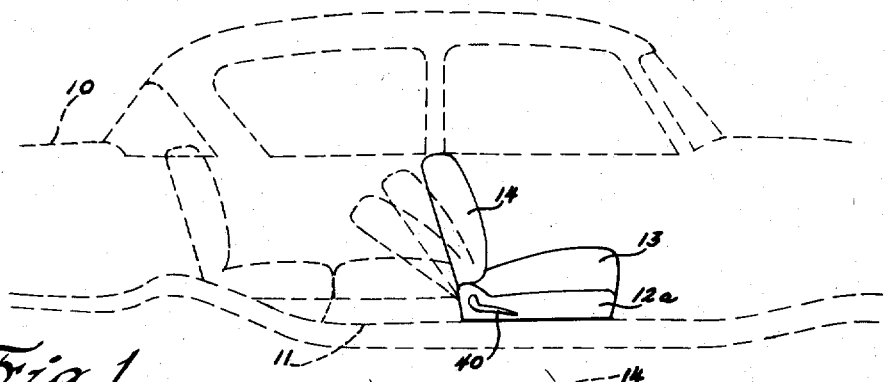
Figure 1 is a diagrammatic elevational view of an automobile body employing the present invention.

*I have shown a seat asembly in which two seat backs are employed, each of which is hingedly connected to the seat frame and each of which employs identical type of mechanism for effecting reclination, consequently while the description hereinafter will be confined to one seat back and its associated mechanism, it will be understood that such description is equally applicable to the second seat back.*

*In general, the seat assembly is mounted in the passenger compartment of an automotive vehicle identified generally by the numeral 10. The floor 11 of the vehicle supports the seat frame which is identified generally by the numeral 12 and is situated between the end boards 12a. A seat cushion 13 is removably supported on the seat frame and the seat backs 14 are carried by the seat frame, being hinged thereto for swinging movement forwardly or rearwardly relative to such frame.*

[Referring now in detail to the drawings, a vehicle body is indicated generally at 10 in Figure 1. Within the vehicle body there is provided a floor board 11 mounting the seat frame 12 upon which is mounted the seat cushion 13 and to which is secured the tilting seat back 14.]

Figure 2:
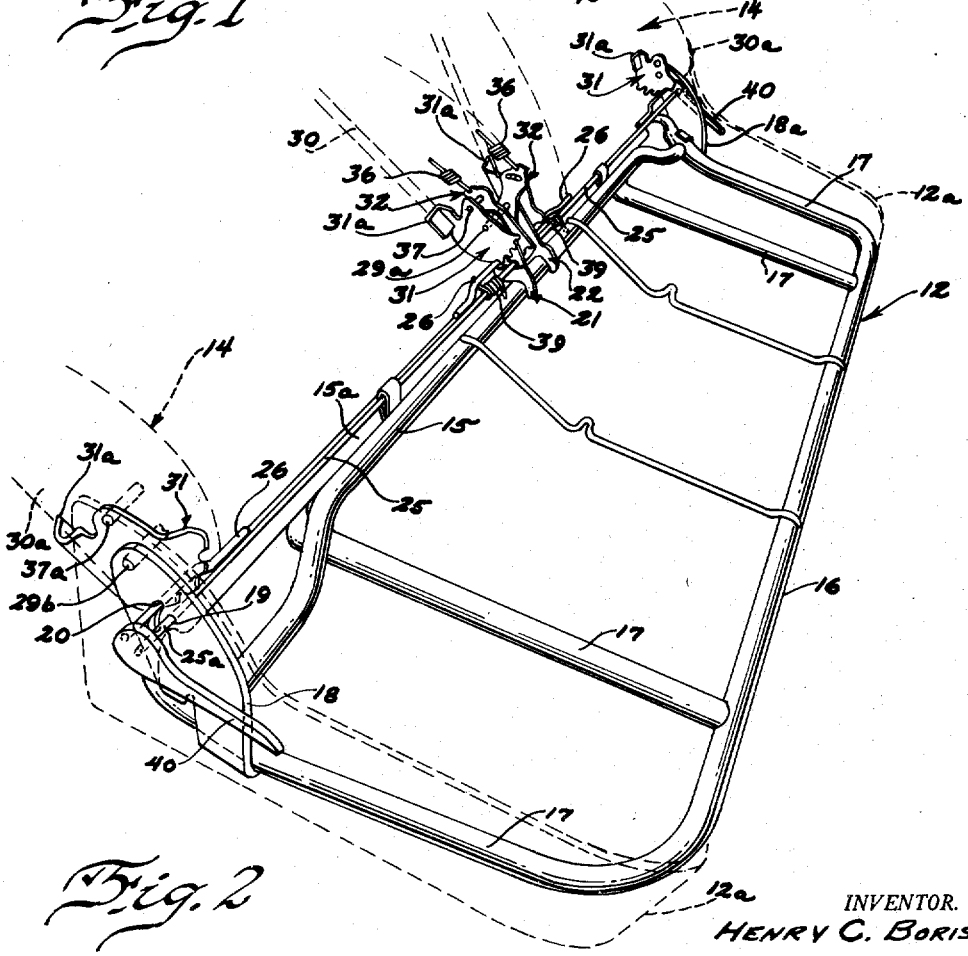
Figure 2 is a perspective view showing the arrangement of my invention with respect to a full double front seat structure.
Figure 3:
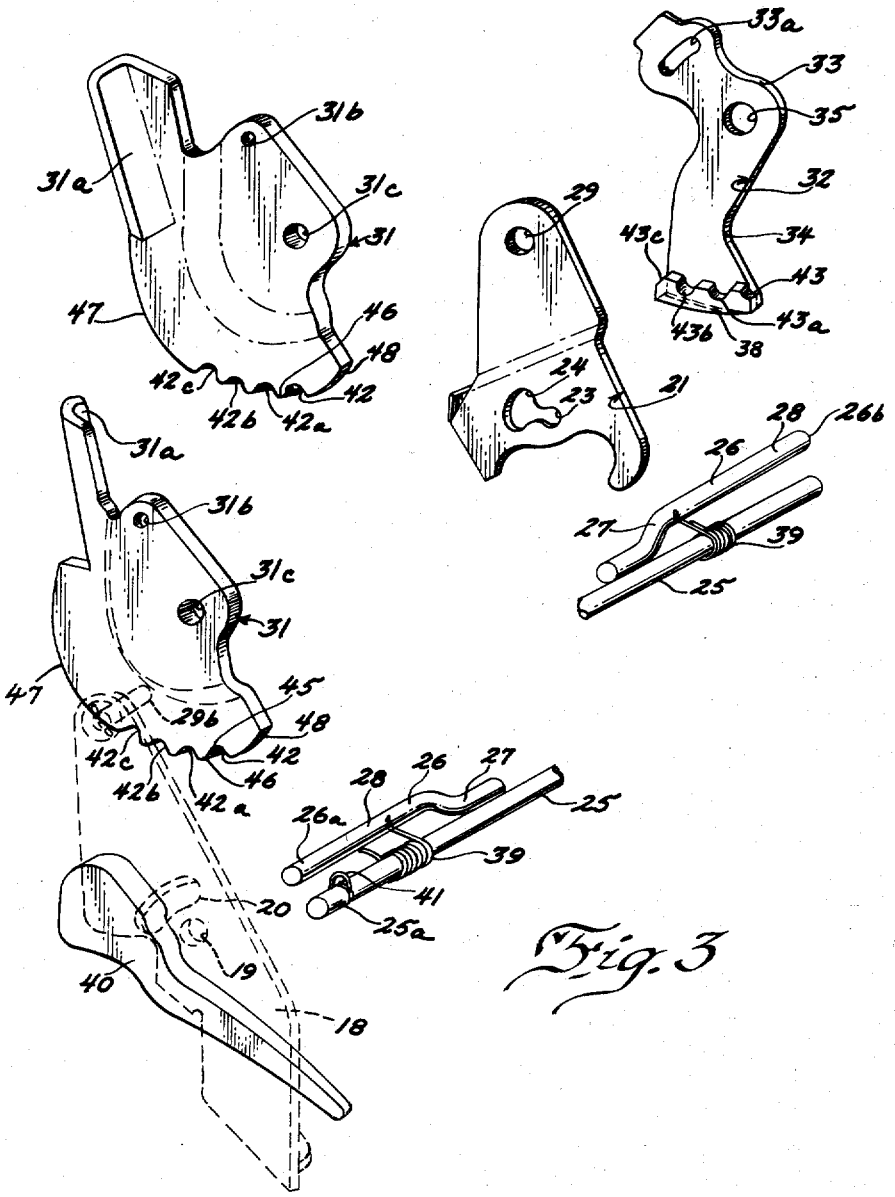
Figure 3 is a detailed perspective view illustrating in disassembled or exploded position certain of the parts illustrated in Figure 2.
Figure 4:
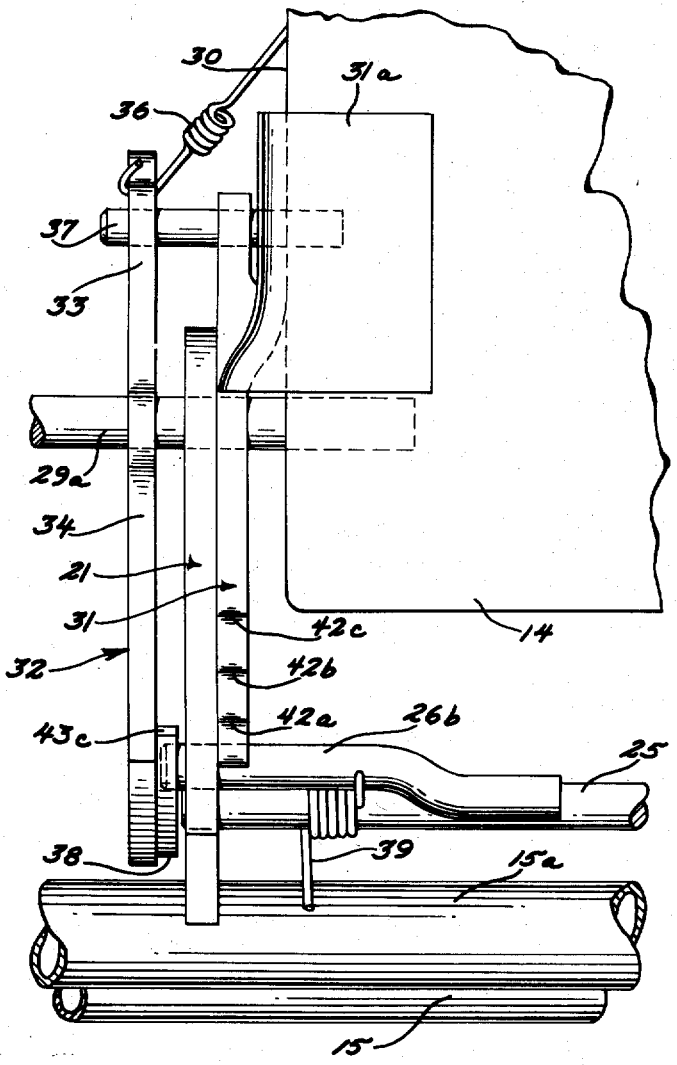
*Figure 4 is a detailed rear view of the latching mechanism at the inner end of one of the seat back rests.*

Considering now the construction shown in Figures 2 and 3, inclusive, the seat frame 12 includes transversely extending tubular bars 15 and 16 which are fastened together by cross members 17. *An additional tubular bar 15a extends alongside of bar 15 and forms part of the seat frame.* Mounted upon each end of seat frame 12 and adjacent the end cross members 17 are [vertical] *vertically* extending pillars or brackets 18 and 18a. Each bracket is provided with a pair of [communicating] apertures, one of lesser [diameter] *area* designated by the numeral 19 and one of greater area which is arcuately shaped and designated by numeral 20.

A pair of spaced relatively wide reinforcing plates 21 and 22 are anchored to the longitudinally extending *bars 15 and 15a* [bar 15] approximately midway between the end cross members 17. These plates project vertically away from bar 15 and are provided with apertures 23 and 24 of approximately the same size and shape as apertures 19 and 20 of bracket 18. These apertures 19, 20, 23 and 24, respectively, are so arranged in operative position whereby aperture 19 is in direct line with aperture 23, and aperture 20 is in direct line with aperture 24.

A longitudinally extending operating shaft 25 [is mounted between each pair of brackets 18 and 21, and 18a and 22,] *extends between and is pivotally supported by brackets 18 and 21* with the free ends of said shaft projecting into and through aligned apertures 19 and 23. Attention is directed to the fact that the end of the shaft [adjacent aperture 23 terminates immediately beyond said aperture 23 while the other end of said shaft projects a substantial distance beyond the aperture 19.] *which is received in aperture 23 terminates immediately beyond the end face of bracket 21 while the other end of the shaft projects through aperture 19 and on into the lever 40.* The explanation for this particular arrangement will be given later as this description progresses.

*Latch rods 26 are secured adjacent each end of shaft 25 and each latch rod is bent at 27 away from said shaft, terminating with the free end 28.* [Latch rods 26, of which there are ordinarily four used in the particular installation in the vehicle of the instant description, are arranged so one rod is mounted adjacent each end of shaft 25. One end of the rod is secured to the shaft and then bent at an angle away from said shaft, as indicated by numeral 27, with the free end 28 of said rod arranged] *which is generally* parallel with said operating shaft. Attention is directed to one of said *latch* rods 26, more specifically characterized by the numeral 26a which projects through aperture 20. The free end of this rod terminates approximately in line with the free end of shaft 25a projecting through aperture 19 *and is secured in lever 40.*

Attention is also directed to *the other latch rod* [another of said rods] 26, characterized by the numeral 26b. This rod projects through aperture 24 of bracket 21 and instead of terminating in line with the end of operating shaft 25 projecting through aperture 23, extends forwardly a short distance, the purpose of which will be elaborated on as this description progresses.

*Brackets 18 and 21 are* [Each of the brackets 18, and 21 and 22 are provided with an enlarged opening 29 at the upper end adapted to receive a hinge pin 29a, one each of which is anchored in each end wall 30 of the seat backs 14 and upon which the seat] *provided with openings 29 at their upper ends adapted to receive hinge pins 29a and 29b, one each of which is received respectively in end walls 30 and 30a of the seat back 14 and upon which the seat* backs are hingedly mounted.

*Brackets 31 carry the seat back 14, one each of such brackets being secured to the opposite end walls 30 and 30a. Each such bracket has an inwardly turned flange 31a which overhangs the rear wall of the seat back and each such bracket has an opening 31b through which the fastening pins 37 and 37a project—such pins being firmly anchored in the end walls 30 and 30a respectively. Each bracket 31 is also provided with an opening 31c through which the hinge pins 29a and 29b extend. The hinge pins which are carried respectively by brackets 21 and 18 thus serve to support the seat back relative to such brackets 21 and 18 for swinging movement about the axes of such pins.*

*Each bracket 31 has notches formed in the lower edge thereof—such notches lying in an arcuate path generated from the axis of its respective hinge pin. The latch rods 26a and 26b are normally received in a corresponding notch of the brackets 31 as will be explained more fully hereinafter.* [Each of the end walls 30 of the seat backs 14 is provided with an arcuately shaped toothed or notched segment 31. The base of each segment which is provided with a seat back engaging flange 31a is firmly anchored adjacent the base of each end wall by suitable fastening elements at 31b and 31c with the notched portion parallel with and extending at an angle downwardly and away from the end wall of seat back 14. The notches are spaced and in operative position intermittently engaging a portion of said latch rods. The disposition of the segments 31 at both ends of the seat back with the latch rods arranged to engage the notches of the segments, provide adequate support for the seat back when said seat is occupied and the occupant leans against said seat back.]

[Attention is directed to the inside end walls of seat backs 14, one end wall of which is designated by the numeral 14a.] Rotatably mounted on the hinge pin 29a [secured] *and adjacent to end wall 30 is a substantially* [to the end wall 14a and adjacent thereto is a substantially] flat faced [link member] *indexing and arresting bracket* 32. In the instant disclosure, two separate seat backets are shown; therefore, one of said [links] *brackets* 32 will be mounted [on] *adjacent* each inside end wall [14a] with the flat side of [each link] *same* arranged *generally* parallel with its respective end wall [14a]. *If desired, the hinge pin 29a can accommodate both seat backs, that is, one end of such pin being received in the end wall of one seat back and the other end of such pin being received in the adjacent end wall of the other seat back (as shown in Figure 2).* The [link] *bracket 32* comprises [two integral sections, one of] *an upper section 33 and a* [which is designated as the upper section 33 and the other, the lower section 34 separated by the opening 35 which receives the] *lower section 34. The upper section has opening 35 through which* hinge pin 29a *extends.* The free end of upper section 33 provides space for mounting one end of a coil spring 36, the other end of said spring *being* secured in the end wall [14a] *30* of its respective seat back 14. Between the free end of section 33 and the opening 35, an [enlarged] *elongated arcuate* slot [33a is formed or cut through the flat side of upper section 33. This slot is of substantial length and sufficient width to receive a pin 37 anchored in the end walls 14a, whereby] *33a is provided through which the free end of fastening element 37 projects.* [the] *The* bracket [or link member] 32 is free to swing rotatively about the pivot pin 29a within the limits permitted by the elongated slot 33a. The lower section 34 projects downwardly and parallel to the plate 21 *and is of sufficient width to* [. The other link member 32 would be arranged parallel to the other plate 22. The width of the free end of lower section 34 is of sufficient proportions to readily] accommodate a [toothed or] notched segment 38 which is welded or otherwise secured to the inside [flat surface of the lower section 34 and parallel and facing the toothed portion of the notched segment 31. The peculiar] *flat surface thereof. The notches lie in an arcuate path generated from the axis of opening 35 and are exposed toward the notched portion of the bracket 31. The* arrangement of the [link member] *bracket* 32 with respect to the spring 36 and slot 33a is such that the [link] *bracket* 32 may have so-called floating characteristics. That is, the [member] *bracket* 32 [alignes] *aligns* the notches in [segments] *brackets* 31 and 32 during movement of *the* latch rod from [segment 31 to segment 32] *one set of notches toward the other* to permit automatic lowering of the seat back one notch at a time.

As shown in Figures 2 and 3 a torsion spring 39 is wound around each end of operating shaft 25 with one end of said spring wound around *and engaging the underside of* the adjacent latch rod and the other end of said spring bearing on the [extending] *upper side of* tubular bar 15.

[Each] *The* end [of seat frame 12] *board 12a* is perforated to provide openings in line with apertures 19 and 20 in bracket 18. The free ends of the operating shaft and latch rod extend through the [seat] *end board* perforations and are secured in one end of [arc] operating lever 40 *as previously explained*. The torsion spring 39 continuously urges the operating shaft 25 rotatively in one direction to return the latch rods to notch engaging position in [segments] *one of the notches of bracket* 31 when manual pressure on handle 40 is released [after]. *After* manual pressure on *the* handle is released, gravity forces the seat back to drop backwardly and torsion spring 39 causes latch rod 26 to move up into the succeeding notch in the [segment] *bracket* 31.

A collar 41 is arranged on operating shaft 25 between bracket 18 and coil spring 39 and, in operative position, is in contact with bracket 18. This collar ordinarily is secured to *the* operating [rod] *shaft 25* by a cotter pin which passes through an aperture provided in said collar and an aligned aperture provided through said operating [rod] *shaft*. The particular function of this collar is to prevent outward longitudinal movement of the operating shaft and latch rod.

Attention is directed to the actual operating ends of operating shaft 25 and latch rod 26. It will be noted that the free end of the operating shaft [terminates and] is rotatably mounted in [aperture 23 of bracket 21] *apertures 19 and 23 of brackets 18 and 21 respectively* while the free end *26b* of latch rod 26 passes through the aperture 24 of bracket 21 sufficiently [to be aligned with the notches in segment 38 of the link member 32] *to make entry into the notches in segment 38 of bracket 32. The free end of shaft 25 terminates at the end face of bracket 21 as explained hereinbefore so as not to interfere with the indexing bracket 32.*

In normal seating position the latch rod rests within the first notch 42 of each of the [segments] *brackets* 31.

Referring to [Figure 2] *Figure 3*, it will be noted that the positioning of latch rods 26 in the arcuately shaped apertures 20 *and 24* is such that as lever 40 is [pushed downwardly] *pulled upwardly*, the latch [rod] *rods* will move in said [aperture 20] *apertures 20 and 24* downwardly and away from containing notch 42 of [segment] *bracket* 31 and into notch 43 of the segment 38 of the [link member] *bracket* 32.

As the release from notch 42 to notch 43 is gradually downward, the seat back must accordingly move a distance calculated from the distance occasioned by release of latch rod in notch 42 to 43.

Referring to [Figure 2] *Figure 3*, it will be noted that the [segment] *bracket 31* includes four notches designated by the numerals 42, 42a, 42b and 42c. It will also be noted that the segment 38 is provided with notches 43, 43a, 43b and 43c. In actual operation, therefore, the seat back, with the arrangement as disclosed, could be adjusted and locked in four predetermined positions. [When the latch rod is disengaged fully from notch 42c there is a continued backward swinging movement of the seat back 14 downwardly and uninterruptedly to a complete reclining or bed position. When the latch rod is disengaged from notch 42 when the seat back is being tilted forwardly from the reclining or bed position, such forward tilting may be freely carried out uninterruptedly to a forward position.]

*The function of the indexing bracket 32 is to make possible the lowering of the seat back one notch at a time.*

*In the normal seating position of the seat back 14 (as shown in Figure 1) the latch rods 26a and 26b are resting in the respective first notches 42 of the brackets 31 under the influence of the torsion springs 39. The occupant of the seat may lean back against the seat back since the front wall 45 of the tooth formed between notches 42 and 42a is bearing against the latch rod 26a forcing same against the upper end of the limiting aperture 24. The same situation exists with reference to the other bracket 31 and latch rod 26b. In order to lower the seat back one notch, the occupant grasps the forward end of lever 40 pulling upwardly on same and causing the rear end of said lever to swing downwardly, thereby swinging the latch rods downwardly to the lower ends of the limiting apertures 20 and 24 of brackets 18 and 21. During this period the latch rod 26b moves into the notch 43 of the indexing bracket thereby preventing the seat back from moving any further into lowering position until manual pressure on the lever 40 is released and the torsion springs 39 swing the latch rods back up into the second notches 42a in the brackets 31.*

*The function of the spring 36 during the seat lowering operation is as follows. While latch rod 26 is in notch 42 the indexing bracket is free and the spring 36 swings the bracket rotatively around support pin 29a until one end of notch 33a engages the pin 37. This action moves notch 43 into position relative to notch 42 whereby the latch rod 26 is free to move out of notch 42 and down into notch 43. Then when manual pressure is released on the lever 40 and the torsion spring 39 commences to move the latch 26 out of the notch 43, the seat back, due to gravity, commences moving downwardly and the latch rod 26b will engage the crest portion 46 beyond dead center of the tooth formed between notches 42 and 42a and the indexing bracket will swing about its pivot 29a against the tension of the spring 36 so as to permit the latch rod 26 to make full entry into the second notch 42a. At this stage the indexing bracket is again free of the latch rod and the spring 36 swings same back into normal position wherein the second notch 43a is positioned to receive the latch rod 26 upon the next application of manual pressure on lever 40. Thus, in lowering the seat back to full horizontal position, the lever 40 must be successively pulled upwardly and then released the number of times determined by the number of notches in brackets 31 until the latch rods are finally swung out of the last notches 42c whereupon the latch rod 26b is free of the indexing bracket and rides along the curved rear wall 47 of bracket 31 as the seat back now moves freely by gravity, to fully lowered position. During the raising of the seat back, the spring 36 of the indexing bracket functions to swing the bracket about support pin 37 as needed for notch aligning purposes. Then as the seat back is moved on forwardly against the seat cushion 13, the upper ends of the apertures 20 and 24 limit the movement of the latch rods so that when the seat back is again swung backwardly, the latch rods will be in the proper position to engage the curved forward surfaces of the brackets 31 and thence move on into the first notches 42.*

*It will be understood that the seat back can be left indefinitely in a selection position of reclination as determined by the notches in brackets 31.*

It is thought that the construction, manipulation, utility, and advantages of this invention will now be apparent to those skilled in this art without a more detailed description thereof.

The present embodiment of the invention has been described in considerable detail merely for the purposes of exemplification since in actual practice it attains the features of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim is:

1. In combination, a seat frame, a seat back, [two segments] *seat back carrying brackets* secured to said seat back, one adjacent each end thereof, said [segments] *seat back carrying brackets* having a plurality of notches therein, a stationary support adjacent each [segment] *seat back carrying bracket and* mounted on said frame,

[a pair of] hinge pins [secured to] *received in* said seat back, one adjacent each end thereof, said pins [engaged with] *carried by* said supports, [a link] *an indexing bracket,* said [link] *indexing bracket being* pivotally mounted on one of said pins and arranged adjacent [the opposite side of] one of said supports, *means for urging the indexing bracket in one direction of rotation about its pivot pin and means for limiting such rotative movement of the indexing bracket about such pivot pin,* said [link] *indexing bracket* [provided with a segment] having a plurality of notches *exposed toward the notches in the adjacent seat back carrying bracket and in proximity thereto* [therein], an operating shaft, [a pair of] latch rods mounted on said operating shaft, one adjacent each end thereof *and one of such latch rods being situated between the notches in the seat back carrying bracket and the notches in the indexing bracket,* said shaft [and rods being engaged with] *rotatably carried by* said supports, [one of said rods arranged to intermittently engage one or the other of said first mentioned notches and said second mentioned notches.] *whereby rotation of said shaft effects movement of said one of the latch rods from one of the notches in the seat back carrying bracket to one of the notches in the indexing bracket for temporarily arresting seat back movement.*

2. In combination, a seat frame, a seat back, [two segments] *seat back carrying brackets* secured to said seat back, one adjacent each end thereof, said [segments] *seat back carrying brackets* having a plurality of notches therein, a stationary support adjacent each [segment] *seat back carrying bracket and* mounted on said frame, said supports *being* arranged in spaced relation to one another and having aligned apertures, [a pair of] hinge pins [secured to] *received in* said seat back, one adjacent each end thereof, said pins [engaged with] *carried by* said supports, [a link] *an indexing bracket,* said [link] *indexing bracket being* pivotally mounted on one of said pins and arranged adjacent [the opposite side of] one of said supports, *a spring connected between the indexing bracket and the seat back for urging the indexing bracket in one direction of rotation about its pivot pin; an element carried by the seat back and coacting with the indexing bracket for limiting the rotative movement of the indexing bracket about such pivot pin,* said [link] *indexing bracket being* provided with a [segment having] a plurality of notches *exposed toward the notches in the adjacent seat back carrying bracket and in proximity thereto* [therein], an operating shaft, [a pair of] latch rods mounted on said operating shaft, one adjacent each end thereof *and one of such latch rods being situated between the notches in the seat back carrying bracket and the notches in the indexing bracket,* said shaft and rods being [engaged] *reecived* in said apertures, [one of said rods arranged to intermittently engage one or the other of said first mentioned notches and said second mentioned notches.] *whereby rotation of said shaft effects movement of said one of the latch rods from one of the notches in the seat back carrying bracket to one of the notches in the indexing bracket for temporarily arresting seat back movement.*

3. In combination, a seat frame, a seat back, [two segments] *seat back carrying brackets* secured to said seat back, one adjacent each end thereof, said [segments] *seat back carrying brackets* having a plurality of notches therein, a stationary support adjacent each [segment] *seat back carrying bracket and* mounted on said frame, said supports arranged in spaced relation to one another, each support being provided with a pair of openings, one of said openings in said pair in each support being arcuately shaped, each pair of said openings in said opposed supports *being* aligned with each other, [a pair of hinged pins secured] *hinge pins received in* [to] said seat back, one adjacent each end thereof, said pins *being* [engaged with] *carried by* said supports, [a link] *an indexing bracket,* said [link] *indexing bracket being* pivotally mounted on one of said pins and arranged adjacent [the opposite side of] one of said supports, *a spring connected between the indexing bracket and the seat back for urging the indexing bracket in one direction of rotation about its pivot pin; an element carried by the seat back and coacting with the indexing bracket for limiting the rotative movement of the indexing bracket about such pivot pin,* said [link] *indexing bracket being* provided with a segment having a plurality of notches *exposed toward the notches in the adjacent seat back carrying bracket and in proximity thereto* [therein], an operating shaft, a pair of latch rods mounted on said operating shaft, one adjacent each end thereof *and one of such latch rods being situated between the notches in the seat back carrying bracket and the notches in the indexing bracket,* said shaft being [engaged with] *rotatably received in* one pair of aligned openings, each of said rods being [engaged] *received in* [with] the adjacent arcuately shaped opening, [one of said rods arranged to intermittently engage one or the other of said first mentioned notches and said second mentioned notches.] *whereby rotation of said shaft effects movement of said one of the latch rods from one of the notches in the seat back carrying bracket to one of the notches in the indexing bracket for temporarily arresting seat back movement and rotative movement of the shaft is limited by the extent of movement of the latch rods within their respective arcuate openings.*

4. In combination, a seat frame, a seat back, two [segments] *seat back carrying brackets* secured to said seat back, one adjacent each end thereof, said [segments] *seat back carrying brackets* having a plurality of notches therein, a stationary support adjacent each [segment] *seat back carrying bracket and* mounted on said frame, a pair of hinge pins [secured to] *received in* said seat backs, one adjacent each end thereof, said pins [engaged with] *carried by* said supports, [a link] *an indexing bracket,* said [link] *indexing bracket being* pivotally mounted on one of said pins and arranged adjacent [the opposite side of] one of said supports, a guide pin, said guide pin secured in said seat back adjacent said [link] *indexing bracket,* said [link] *indexing bracket* provided with a slot, said guide pin arranged to project into said slot, a coil spring, one end of said spring secured to said seat back, the other end of said spring mounted on one end of said [link] *indexing bracket,* said [link] *indexing bracket* provided with a segment at its other end having a plurality of notches *exposed toward the notches in the adjacent seat back carrying bracket and in proximity thereto* [therein], an operating shaft *rotatably carried by said supports,* a pair of latch rods mounted on said operating shaft, one adjacent each end thereof *and one of such latch rods being situated between the notches in the seat back carrying bracket and the notches in the indexing bracket,* [said shaft and rods being engaged with said supports, one of said rods arranged to intermittently engage one or the other of said first mentioned notches and said second mentioned notches.] *whereby rotation of said shaft effects movement of said one of the latch rods from one of the notches in the seat back carrying bracket to one of the notches in the indexing bracket for temporarily arresting seat back movement.*

5. In combination, a seat frame, a seat back, two [segments] *seat back carrying brackets* secured to said seat back, one adjacent each end thereof, said [segments] *seat back carrying brackets* having a plurality of notches therein, a stationary support adjacent each [segment] *seat back carrying bracket and* mounted on said frame, a pair of hinge pins [secured to] *received in* said seat back, one adjacent each end thereof, said pins [engaged with] *carried by* said supports, [a link] *an indexing bracket,* said [link] *indexing bracket being* pivotally mounted on one of said pins and arranged adjacent [the opposite side of] one of said supports, said [link] *indexing bracket being* provided with a segment having a plurality of notches *exposed toward the notches in the adjacent seat*

*back carrying bracket and in proximity thereto* [therein], an operating shaft, a pair of latch rods mounted on said operating shaft, one adjacent each end thereof *and one of such latch rods being situated between the notches in the seat back carrying bracket and the notches in the indexing bracket,* said shaft and rods being engaged with said *supports* [support], one end of said shaft and one of said rods extending through [the adjacent] *one* support the same distance, the other end of said shaft ending just beyond [said] *the* other support with [said] *the* other rod projecting a substantial distance beyond the other support, [said] *a lever secured to the* first mentioned shaft end and rod [providing support for a lever], said last mentioned rod *being the one situated between the notches in the seat back carrying bracket and the notches in the indexing bracket and* arranged to [intermittently engage a notch of the first mentioned segments] *swing between a notch of the seat back carrying bracket* and a notch of said [link] *indexing bracket* segment as said lever is manually operated.

6. In combination, a seat frame, a seat back, two [segments] *seat back carrying brackets* secured to said seat back, one adjacent each end thereof, said [segments] *seat back carrying brackets* having a plurality of notches therein, a stationary support adjacent each [segment] *seat back carrying bracket and* mounted on said frame, a pair of [hinged] *hinge* pins [secured to] *received in* said seat back, one adjacent each end thereof, said pins [engaged with] *carried by* said supports, [a link] *an indexing bracket,* said [link] *indexing bracket being* pivotally mounted on one of said pins and arranged adjacent [the opposite side of] one of said supports, a guide pin, said guide pin secured in said seat back adjacent said [link] *indexing bracket,* said [link] *indexing bracket* provided with a slot, said guide pin arranged to project into said slot, a coil spring, one [each] *end* of said [springs] *spring* mounted on one end of said [link] *indexing bracket,* the other end secured to said seat back, said [link] *indexing bracket* [provided with a segment at its other end] having a plurality of notches [therein] *exposed toward the notches in the adjacent seat back carrying bracket and in proximity thereto,* an operating shaft, a pair of latch rods mounted on said operating shaft, one adjacent each end thereof *and one of such latch rods being situated between the notches in the seat back carrying bracket and the notches in the indexing bracket,* said shaft and rods being [engaged with] *carried on* said [support] *supports,* one end of said shaft and one of said rods extending through [the adjacent] *one* support the same distance, the other end of said shaft ending just beyond [said] *the* other support with [said] *the* other rod projecting a substantial distance beyond the other support, *a lever secured to* said first mentioned shaft end and rod [providing support for a lever], said last mentioned rod *being the one situated between the notches in the seat back carrying bracket and the notches in the indexing bracket and* arranged to [intermittently engage] *swing between* a notch of the [first mentioned segments] *seat back carrying bracket* and a notch of said [link] *indexing bracket* [segment] as said lever is manually operated.

7. In combination, a seat frame, a seat back, two [segments] *seat back carrying brackets* secured to said seat back, one adjacent each end thereof, said [segments] *seat back carrying brackets* having a plurality of notches therein, a stationary support adjacent each [segment] *seat back carrying bracket and* mounted on said frame, said supports arranged in spaced relation to one another and having aligned apertures, an operating shaft, a pair of latch rods mounted on said operating shaft, one adjacent each end thereof, said shaft and rods being engaged with said apertures, one end of said shaft and one of said rods extending through [the adjacent] *one* support the same distance, the other end of said shaft ending just beyond said other support with said other rod projecting a substantial distance beyond the other support, *a lever secured to* said first mentioned shaft end and rod [providing support for a lever], a pair of hinge pins [secured to] *received in* said seat back, one adjacent each end thereof, said pins engaged with said supports, [a link] *an indexing bracket,* said [link] *indexing bracket* pivotally mounted on one of said pins and arranged adjacent [the opposite side of] one of said supports, a guide pin, said guide pin secured in said seat back adjacent said [link] *indexing bracket,* said [link] *indexing bracket* provided with a slot, said guide pin arranged to project into said slot, a coil spring, one end of said spring mounted on one end of said [link] *indexing bracket,* the other end of said spring secured to said seat back, said [link] *indexing bracket* provided with a segment at its other end having a plurality of notches *exposed toward the notches in the adjacent seat back carrying bracket and in proximity thereto* [therein], said last mentioned rod *being located between the notches in the seat back carrying bracket and the notches in the segment of the indexing bracket* [arranged] to [intermittently engage] *swing between* a notch of *one of* the first mentioned [segments] *seat back carrying brackets* and a notch of said [link] *indexing bracket* segment as said lever is manually operated.

8. In combination, a seat frame, a seat back, two [segments] *seat back carrying brackets* secured to said seat back, one adjacent each end thereof, said [segments] *seat back carrying brackets* having a plurality of notches therein, a stationary support adjacent each [segment] *seat back carrying bracket and* mounted on said frame, said supports arranged in spaced relation to one another, each support being provided with a pair of [communicating] openings, one of said openings in said pair in each support being arcuately shaped, each pair of said openings in said opposed supports aligned with each other, an operating shaft, a pair of latch rods mounted on said operating shaft, one adjacent each end thereof, said shaft and rods being engaged with said openings, one end of said shaft and one of said rods extending through [the adjacent] *one* support the same distance, the other end of said shaft ending just beyond *the* [said] other support with [said] *the* other rod projecting a substantial distance beyond the other support, *a lever secured to* said first mentioned shaft end and rod [providing support for a lever], a pair of [hinged] *hinge* pins [secured to] *received in* said seat back, one adjacent each end thereof, said pins engaged with said supports, [a link] *an indexing bracket,* said [link] *indexing bracket* pivotally mounted on one of said pins and arranged adjacent [the opposite side of] one of said supports, a guide pin, said guide pin secured in said seat back adjacent said [link] *indexing bracket,* said [link] *indexing bracket* provided with a slot, said guide pin arranged to project into said slot, a coil spring, one end of said springs mounted on one end of said [link] *indexing bracket,* the other end of said spring secured to said seat back, said [link] *indexing bracket* provided with a segment at its other end having a plurality of notches *exposed toward the notches in the adjacent seat back carrying bracket and in proximity thereto, the last mentioned rod being situated between the notches in the seat back carrying bracket and the notches in the segment of the indexing bracket* [therein], whereby manual operation of said lever causes said rods to move in said arcuate openings and to cause said last mentioned rod to [intermittently engage] *swing between* a notch of [the first mentioned segments] *said adjacent seat back carrying bracket* and a notch of said [link] *indexing bracket* segment.

9. In combination, a seat frame, a seat back, two [segments] *seat back carrying brackets* secured to said seat back, one adjacent each end thereof, said [segments] *seat back carrying brackets* having a plurality of notches therein, a stationary support adjacent each [segment] *seat back carrying bracket and* mounted on said frame, a pair of [hinged] *hinge* pins [secured to] *received in* said seat back, one adjacent each end thereof, said pins engaged with said supports, [a link] *an indexing bracket,* said [link] *indexing bracket being* pivotally mounted on one of said pins and arranged adjacent [the opposite side of] one of said supports, said [link] *indexing bracket* provided with a segment having a plurality of notches *exposed toward the notches in the adjacent seat back carrying bracket and in proximity thereto* [therein], an operating shaft, a pair of latch rods mounted on said shaft, one adjacent each end thereof, said shaft and rods being engaged with said supports, a hand lever mounted on one end of said shaft and one of said rods, spaced coil springs arranged on said operating shaft, one free end of each spring wound around one of said rods, the other free end of said spring bearing on said frame, whereby said rods and shaft may be held under spring tension, one of said rods *being situated between the notches in the seat back carrying bracket and the notches in the indexing bracket and said last mentioned rod being* arranged to [intermittently engage] *swing between* one or the other of said first mentioned notches and said second mentioned notches to cause [automatic] lowering of said seat back one notch at a time by manual manipulation of said hand lever.

*10. A seat assembly comprising: a supporting frame forming the base of the seat assembly; a seat back hingedly carried by the frame for swinging movement from an upright to a reclined position relative to the frame; latching mechanism carried by the frame; means for releasing the mechanism to effect a lowering of the seat back relative to the frame as a result of gravity; an indexing bracket carried on the frame for swinging movement relative to the frame and relative to the seat back and means carried on the seat back and coacting with the indexing bracket for limiting the swinging movement of the indexing bracket relative to the seat back, said indexing bracket coacting with the latching mechanism for temporarily arresting the movement of the seat back in lowering direction, said latching mechanism permitting raising of the seat back from a reclined position to upright position.*

*11. A seat assembly comprising: a supporting frame forming the base of the seat assembly; a seat back hingedly carried by the frame for swinging movement from an upright to a reclined position relative to the frame; latching mechanism having interconnection between the seat back and seat frame for effecting a controlled raising and lowering of the seat back relative to the frame; said latching mechanism including a bracket secure with the seat back and an indexing bracket movably carried on the frame and limitedly movable relative to the seat back; a latch mounted on the frame for movement between the brackets; said first bracket having successive latch receiving surfaces for positively holding the seat back in a selected position of reclination whenever the latch is received in one of such surfaces; said indexing bracket having latch receiving surfaces in proximity to and exposed toward the latch receiving surfaces in the first bracket and serving for positively holding the seat back within a limited range of movement whenever the latch is received in one of such surfaces; said latch being positioned between the latch receiving surfaces on the first bracket and the latch receiving surfaces on the indexing bracket; control means for moving the latch from one of the latch receiving surfaces of the first bracket into engagement with one of the latch receiving surfaces on the indexing bracket, whereby gravity effects a lowering of the seat back during movement of the latch from the first bracket to the indexing bracket and whereby lowering of the seat back is positively arrested when the latch is engaged in one of the latch receiving surfaces on the indexing bracket and means for aligning the latch receiving surfaces on the indexing bracket with reference to the latch receiving surfaces on the first bracket, such last mentioned means including an element carried on the seat back and coacting with the indexing bracket for limiting movement of the indexing bracket relative to the seat back and such last mentioned means also including a resilient element connected between the seat back and the indexing bracket for urging the indexing bracket in one direction of movement relative to the seat back.*

*12. Apparatus as set forth in claim 11 wherein limiting means are secured to the seat frame for limiting the movement of the latch whenever same is free of the latch engaging surfaces on the first bracket and the indexing bracket.*

*13. A seat assembly comprising: a supporting frame forming the base of the seat assembly; spaced supports carried by the frame; hinge pins carried by the supports; a seat back carried on said pins for swinging movement from an upright to a reclined position; latching mechanism carried on one of the hinge pins for effecting a controlled raising and lowering of the seat back relative to the frame; said latching mechanism including a bracket secure with the seat back and mounted for swinging movement on the hinge pin adjacent one of the supports; an indexing and arresting bracket mounted for swinging movement on the same hinge pin as the first bracket and swingable relative to the seat back, said last mentioned support being situated between the first mentioned bracket and the indexing and arresting bracket; a latch mounted on the frame for movement between the brackets; said first bracket having successive latch receiving surfaces for positively holding the seat back in a selected position of reclination whenever the latch is received in one of such surfaces; said indexing bracket having latch receiving surfaces in proximity to and exposed toward the latch receiving surfaces in the first bracket and serving for positively holding the seat back within a limited range of movement whenever the latch is received in one of such surfaces; said latch being positioned between the latch receiving surfaces on the first bracket and the latch receiving surfaces on the indexing bracket; control means for moving the latch from one of the latch receiving surfaces of the first bracket into engagement with one of the latch receiving surfaces on the indexing bracket, whereby gravity effects a lowering of the seat back during movement of the latch from the first bracket to the indexing bracket and whereby lowering of the seat back is positively arrested when the latch is engaged in one of the latch receiving surfaces on the indexing bracket and means for aligning the latch receiving surfaces on the indexing bracket with reference to the latch receiving surfaces on the first bracket, such last mentioned means including an element carried on the seat back and coacting with the indexing bracket for limiting movement of the indexing bracket relative to the seat back and such last mentioned means also including a resilient element connected between the seat back and the indexing bracket for urging the indexing bracket in one direction of movement relative to the seat back.*

*14. A seat assembly as set forth in claim 13 wherein the support which is situated between the first bracket and the indexing and arresting bracket has an elongated aperture therein through which the latch projects, whereby the extent of movement of the latch is limited to the scope afforded by the length of such aperture.*

References Cited in the file of this patent or the original patent

UNITED STATES PATENTS

| | | |
|---|---|---|
| 368,989 | Assmus | Aug. 30, 1887 |
| 412,617 | Hogan | Oct. 8, 1889 |
| 597,480 | Fellows | Jan. 18, 1898 |
| 2,336,013 | Hamilton | Dec. 7, 1943 |

FOREIGN PATENTS

| | | |
|---|---|---|
| 12,564 | Great Britain | May 24, 1911 |